July 12, 1960
J. H. DRILLICK
2,944,471
COMPOSING APPARATUS
Filed April 22, 1953
8 Sheets-Sheet 1
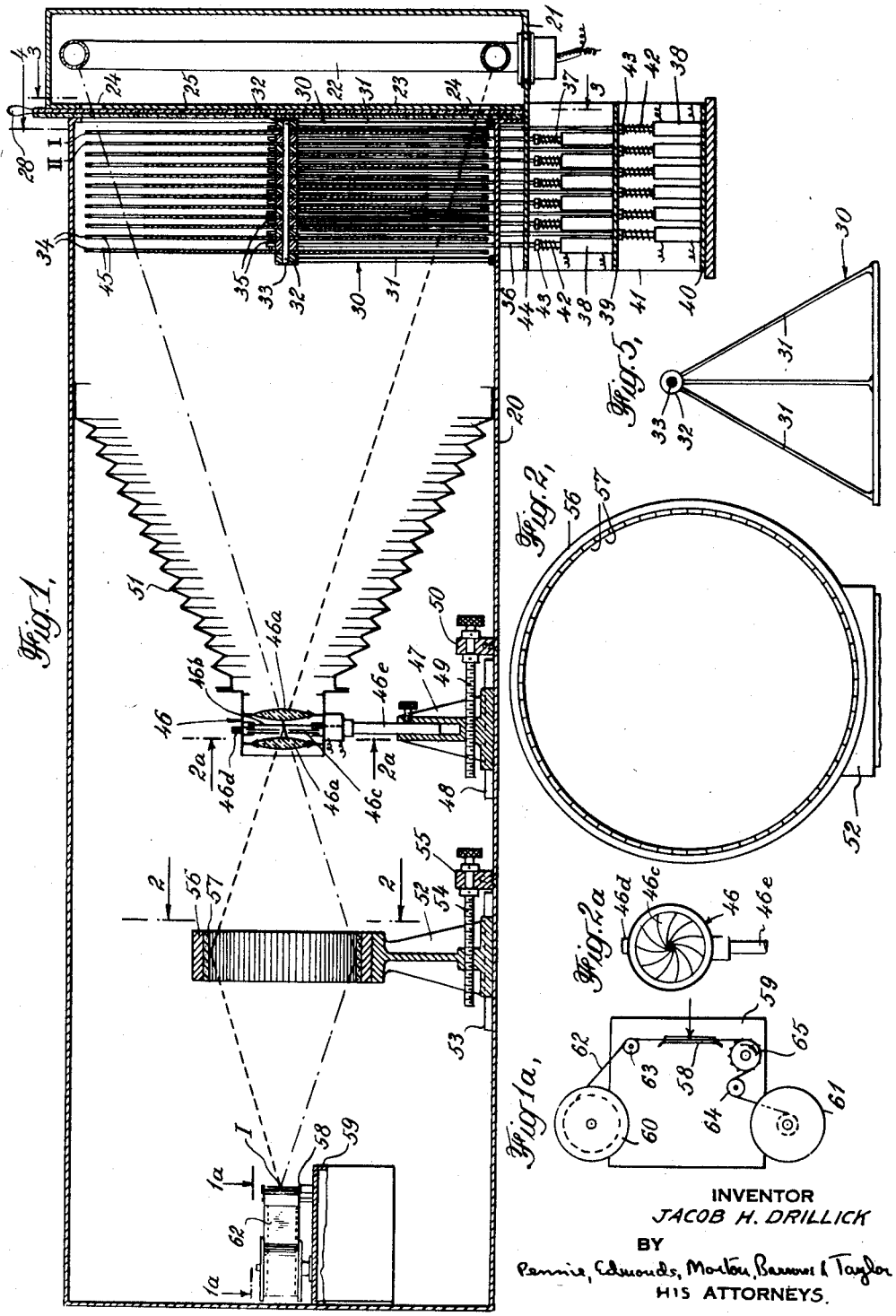
INVENTOR
JACOB H. DRILLICK
BY
Pennie, Edmonds, Morton, Barrows & Taylor
HIS ATTORNEYS.

July 12, 1960 J. H. DRILLICK 2,944,471
COMPOSING APPARATUS
Filed April 22, 1953 8 Sheets-Sheet 2

INVENTOR
JACOB H. DRILLICK
BY
Pennie, Edmonds, Morton, Barrows & Taylor,
HIS ATTORNEYS.

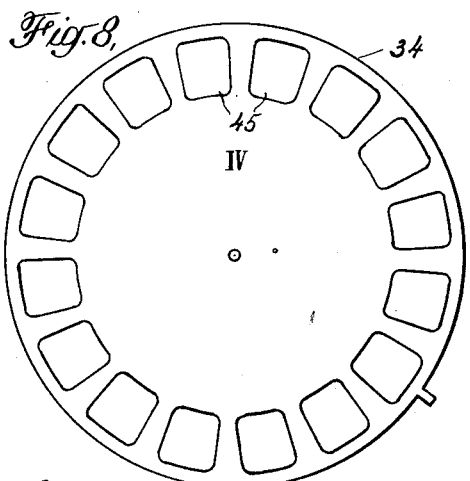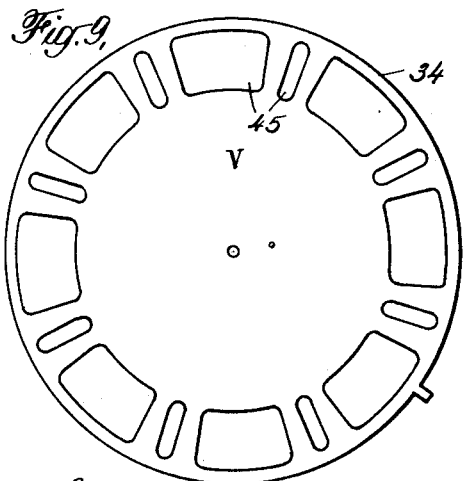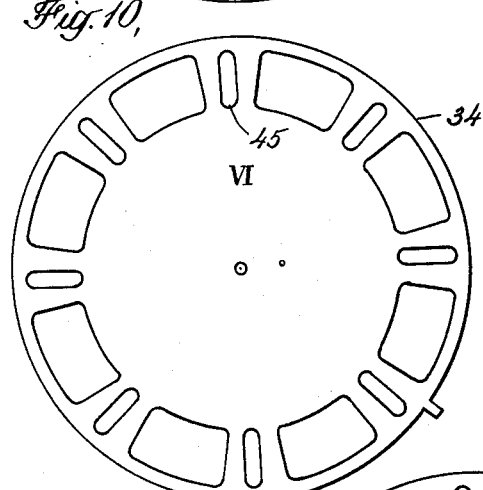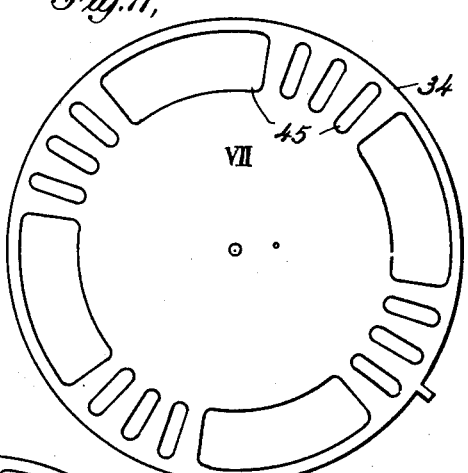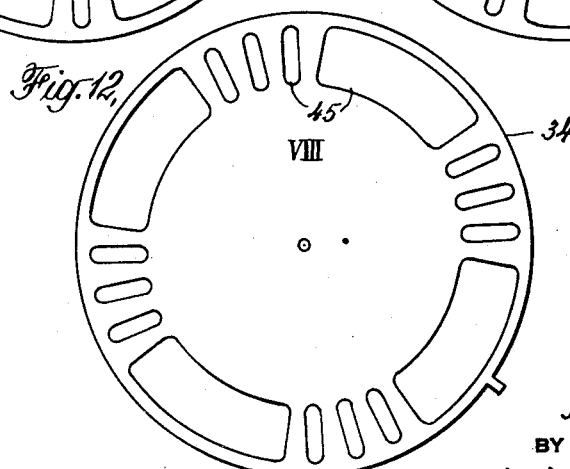

July 12, 1960  J. H. DRILLICK  2,944,471
COMPOSING APPARATUS

Filed April 22, 1953  8 Sheets-Sheet 4

INVENTOR
JACOB H. DRILLICK
BY
Pennie, Edmonds, Morton, Barrows & Taylor,
HIS ATTORNEYS.

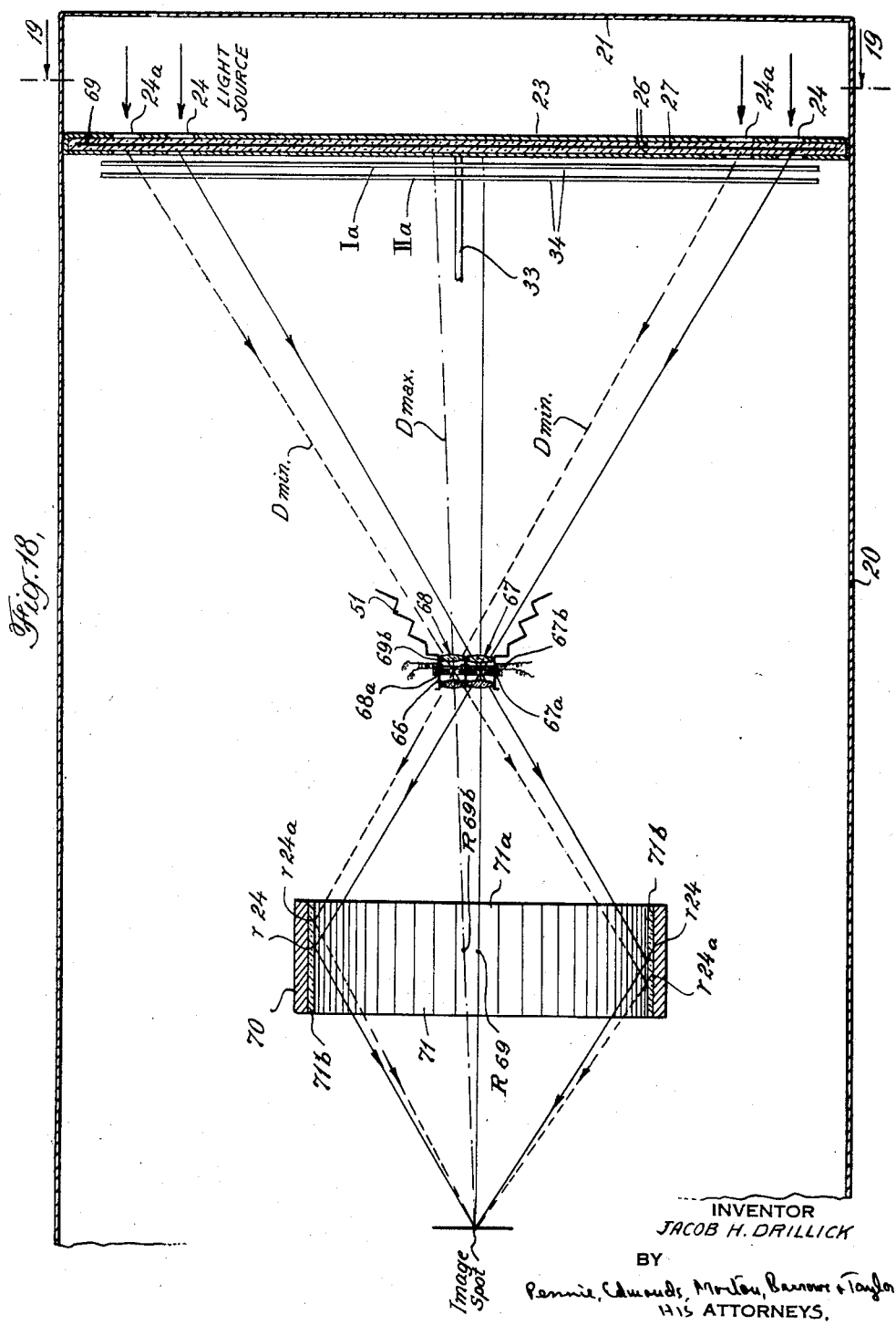

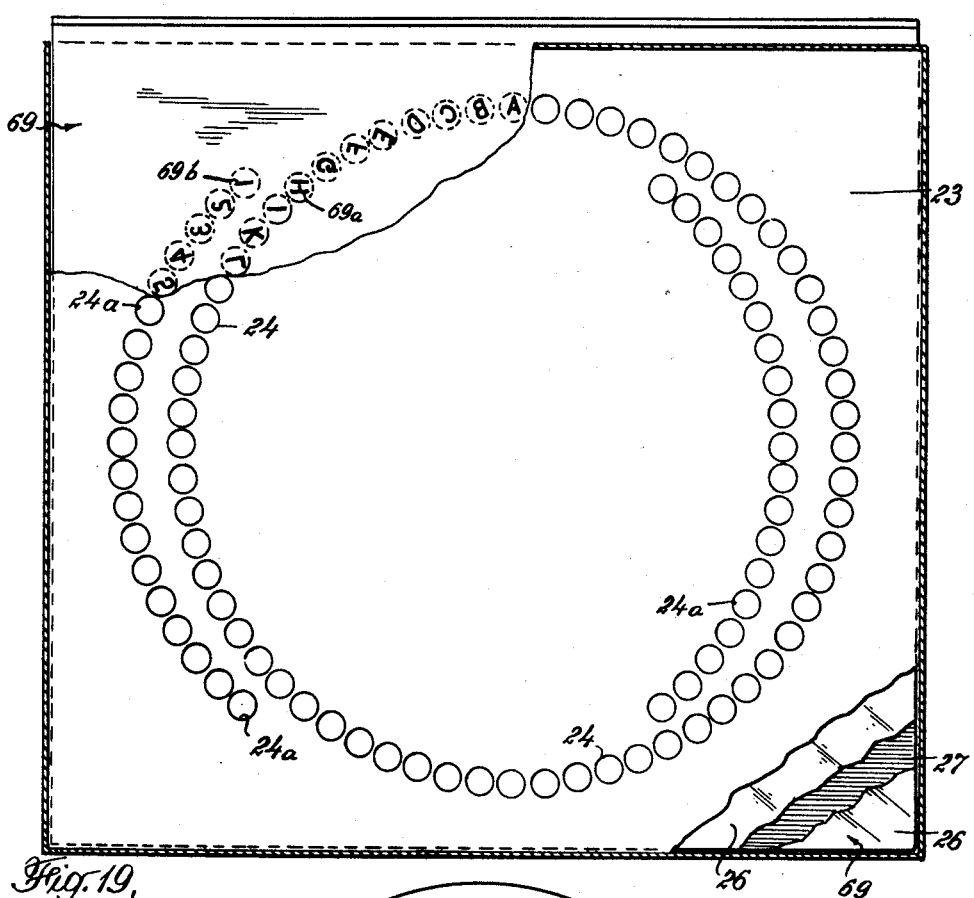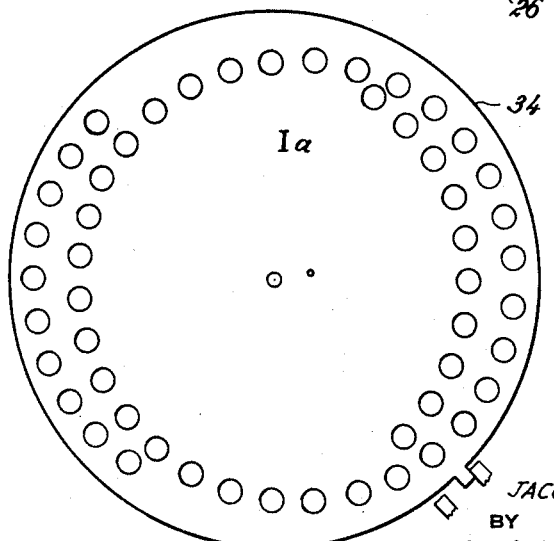

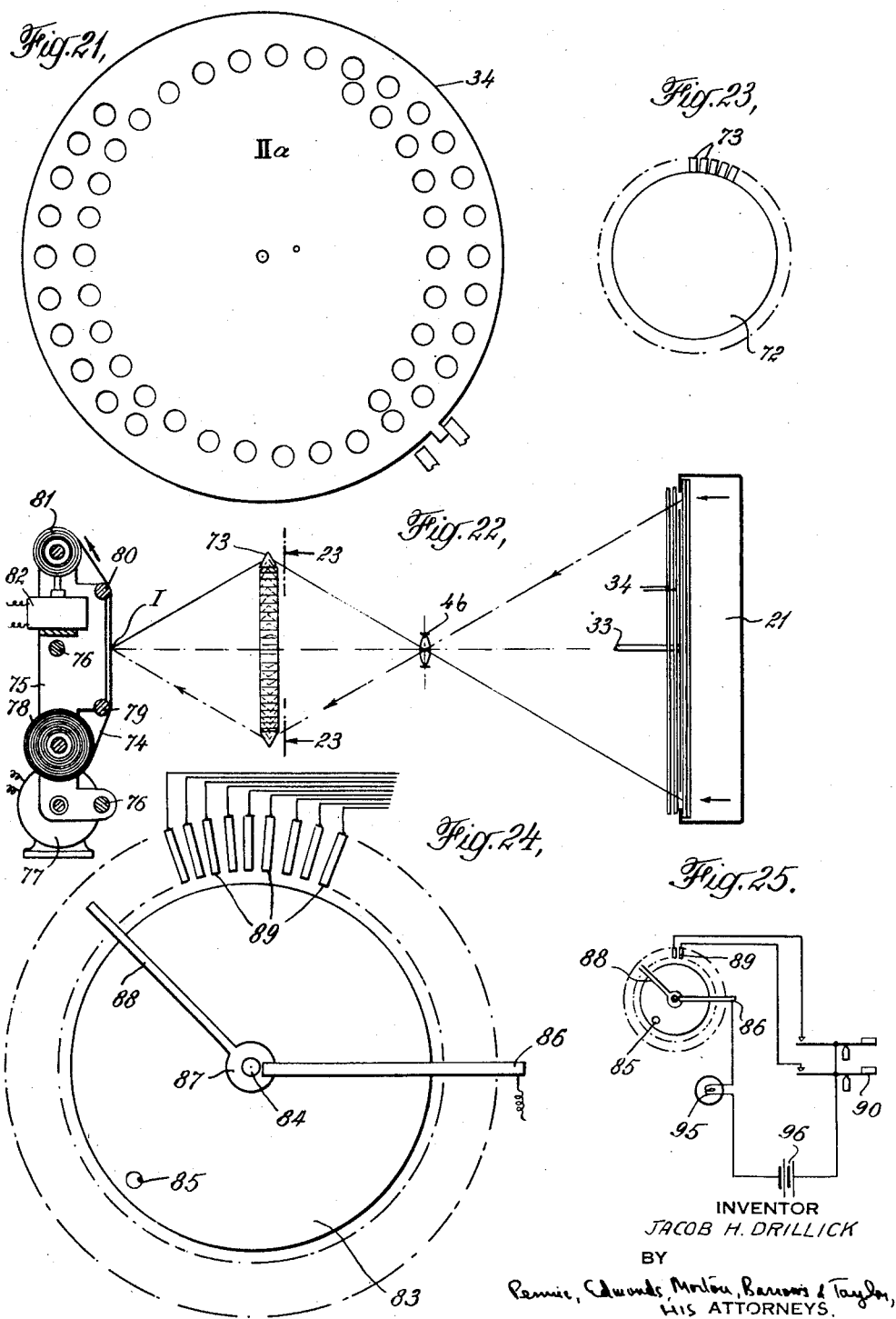

July 12, 1960  J. H. DRILLICK  2,944,471
COMPOSING APPARATUS

Filed April 22, 1953  8 Sheets-Sheet 8

INVENTOR.
JACOB H. DRILLICK
BY
ATTORNEYS

United States Patent Office 2,944,471
Patented July 12, 1960

2,944,471

COMPOSING APPARATUS

Jacob H. Drillick, New York, N.Y., assignor to The Phototypograph Corporation, Dover, Del., a corporation of Delaware Filed Apr. 22, 1953, Ser. No. 350,427

12 Claims. (Cl. 95—4.5)

This invention relates to phototypographs, and in particular to novel means both for projecting characters to be printed onto a photosensitive medium and for selecting the particular character to be printed. This application is a continuation-in-part of my application Serial No. 171,161, filed June 29, 1950, now Patent No. 2,663,-232, which was itself a continuation-in-part of my application, now abandoned, Serial No. 154,291, filed April 6, 1950.

Phototypographs constructed in accordance with my invention may be distinguished from known mechanisms for accomplishing the same purpose by the following:

The font of characters from which a selection is to be made is organized into a predetermined array or group of arrays on a stationary screen at a predetermined object surface, the characters being in contrast to the background;

For each such array of characters, a single projection lens is so positioned as to be able to form an image of the entire array on the object screen at the image surface of the projection lens;

To bring the image of each individual character to a single image spot in that image surface a stationary grouping of light-diverting elements is placed between the lens and its image surface, the position of each light-diverting element being so correlated with the positions of the individual characters in the array or groups of arrays of characters as to accomplish this purpose according to well-known laws of reflection or refraction;

A photosensitive medium is located at the image spot to receive and record the images reaching it;

The relative spacing of the characters photographed upon the photosensitive medium is accomplished by movement of that medium itself in proper synchronism with a mechanism which selects the particular one of the characters to be projected and with a photographic exposure control mechanism.

My invention also includes improved systems of shutters operating to permit the ready selection of individual characters from the array or group of arrays on the object screen as desired and constructed to be especially suitable for use with a punch tape memory device. My fundamental invention, however, lies in the projection system and it can be used with any suitable means for selecting the character to be projected. My own improved systems of shutters include a selective light flash shutter mechanism and a binary-code-controlled shutter assembly for unmasking any individual character at will, all the characters being simultaneously illuminated. With either of these selecting systems, the absence of moving parts in the projection system permits the device to be operated at a very high rate of speed without impairment of the accuracy of alignment of the characters projected.

My invention also includes a novel structure for producing character-arrays or fonts directly on the phototypograph itself. This is done by reversing the direction of light travel through the projection system.

For a better understanding of the invention, reference may be made to the accompanying drawings in which:

Fig. 1 is a view in vertical longitudinal section of a photocomposing machine embodying the new projection system in a preferred form and the code-controlled assembly system of shutters;

Figs. 1a, 2, 2a, 3 and 4 are sectional views on the lines 1a—1a, 2—2, 2a—2a, 3—3 and 4—4, respectively, of Fig. 1;

Fig. 5 is a view in elevation of a detail of the shutter-assembly support 30 of Fig. 1;

Figs. 6 to 16, inclusive, are views in elevation from the direction of the light source 22 of the selector shutters employed in the device;

Fig. 18 illustrates diagrammatically in plan section a phototypograph generally constructed according to Fig. 1, but containing a plurality of character-arrays, a number of projection lenses corresponding to the number of arrays, and a single light-diverting device for bringing the images of the characters of all the arrays to a single image spot;

Fig. 19 is a sectional view on the line 19—19 of Fig. 18;

Figs. 20 and 21 are views in front elevation of two special selector shutters for use with the multiple character array machine of Fig. 18;

Figs. 22 and 23 illustrate diagrammatically a phototypograph generally constructed according to Fig. 1, but employing light-diverting means operating by refraction in place of light-diverting means operating by reflection;

Fig. 24 illustrates diagrammatically a selective light flash shutter mechanism which may be substituted for the code-controlled shutter assembly mechanism of the device of Fig. 1;

Fig. 25 illustrates diagrammatically an electrical circuit suitable for use with the mechanism of Fig. 24;

Figure 3:
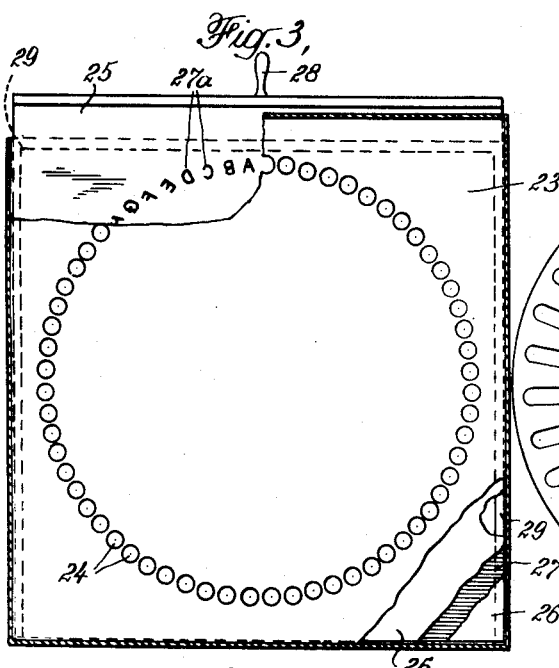
Figure 6:
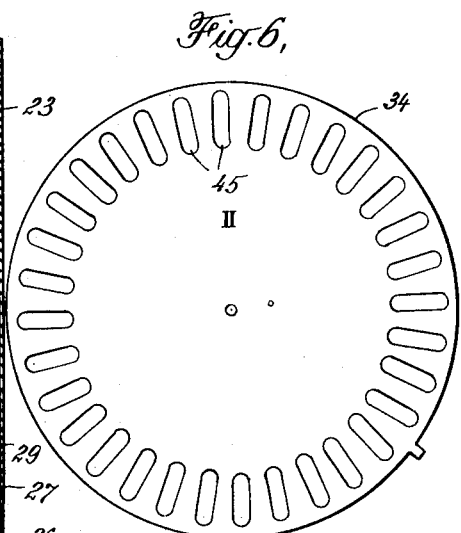
Figure 4:
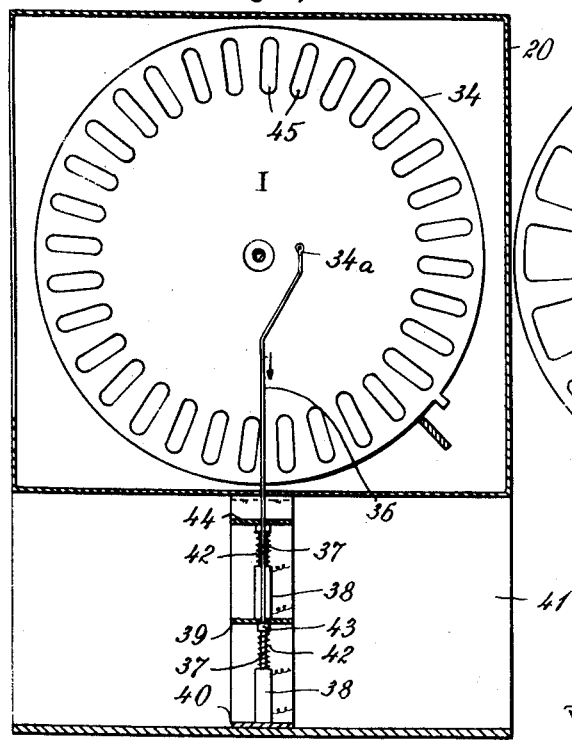
Figure 7:
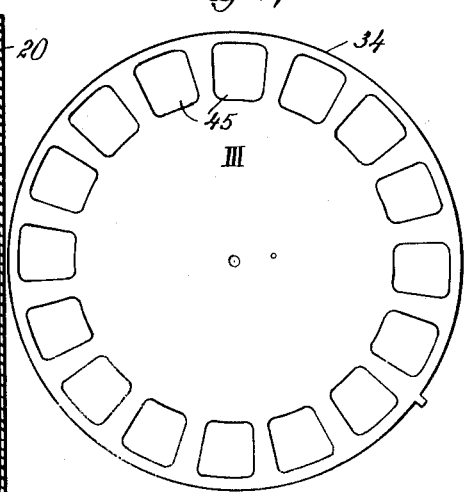
Figure 13:
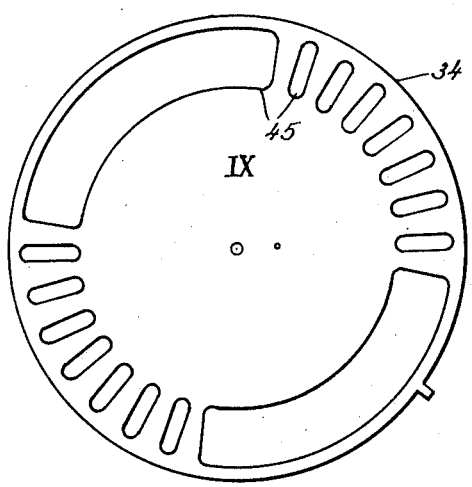
Figure 14:
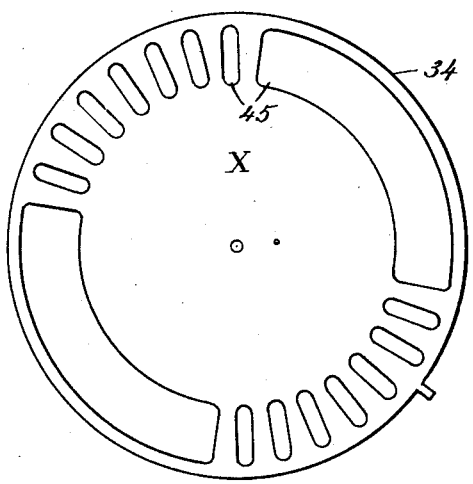
Figure 15:
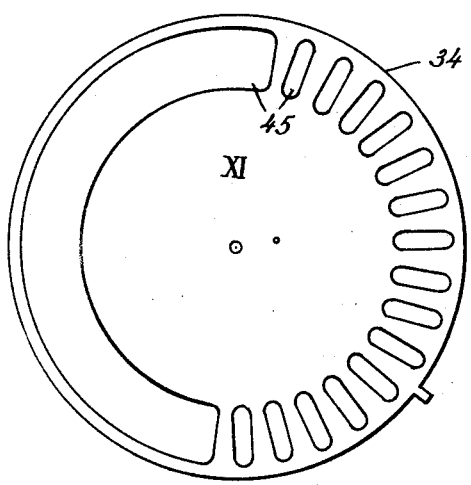
Figure 16:
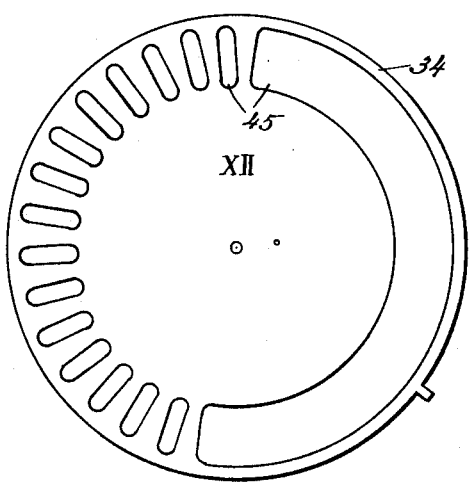

A phototypograph according to my invention in the form shown in Figs. 1–17, inclusive, comprises a light-proof housing 20, at one end of which is a casing 21 containing a source of light diagrammatically indicated at 22. The inner end wall 23 of the casing 21 is opaque except for a plurality of apertures 24 arranged in a circular series. The top wall of housing 20 is provided with a transverse slot adjacent wall 23, through which a slide 25 may be inserted.

The slide is preferably made of a pair of transparent plates 26 of glass, for example, with a sheet 27 between, the sheet 27 being opaque except for a set of sixty-four type characters 27a arranged in a circular series, which lie in front of apertures 24, when the slide is in position. The circular arrangement of the characters 27a on the slide 25 has been adopted for convenience and not of necessity. In this arrangement each character may occupy up to one sixty-fourth of a complete circle which may be thought of as a character unit space. Any other predetermined arrangement of characters can be adopted. The sheet 27 may be made of any suitable material, such as a transparent plastic coated so as to be opaque except for the characters, or, if the reverse contrast is desired, opaque characters on a transparent rectangular ground can be employed the size of rectangular ground depending on the width of its particular character. The slide 25 is provided at its top with a handle 28, by which any given slide may be readily replaced by another, for example, by one bearing characters of a different style. The slide 25 is held in place against the inner face of wall 23 by flanges 29 projecting inwardly from the walls of housing 20.

A pair of standards 30 are mounted on the bottom wall of housing 20, each standard comprising three thin metal strips 31, of which the central strip is vertical and the outer strips converge upwardly to meet the central strip. The strips are so positioned as to lie opposite blank spaces between adjacent apertures 24 on wall 23 and, thus, between adjacent characters on the slide 25. At its top, each standard supports a collar 32 and a rod 33 is carried by the two collars and lies normal to the plane of the slide and with its axis passing through the center of the circular series of apertures 24. A plurality of selector shutters 34 in the form of disks are mounted loosely on the rod and adjacent shutters are separated by collars 35 fast on the rod. Each shutter has an eccentric pin 34a, to which is attached one end of a rod 36 extending through an opening in the bottom wall of housing 20 and connected to the core 37 of a solenoid 38. The solenoids for selector shutters are mounted in upper and lower groups attached to upper and lower plates 39, 40 carried by a standard 41 supporting one end of housing 20. Each of the rods 36 is encircled by a spring 42 bearing at one end against a collar 43 on the rod and, at the other end, against the end of the solenoid, to the core of which the rod is attached. The rods attached to cores of solenoids in the upper group are guided in openings in a plate 44 attached to standard 41 and overlying the solenoids, and the rods attached to cores of solenoids in the lower group pass through aligned openings in plates 39 and 44.

In the apparatus disclosed in Figs. 1–17, the slide 25 carries sixty-four type characters equally spaced in a circle and there are twelve of the selector shutters 34, shown in Figs. 4 and 6 to 16, inclusive, and designated I to XII, inclusive. Of these, the shutter designated I is not necessary for the selection of characters, but cooperates with the shutter designated II to permit all the characters 27a to be blocked off at once. The selector shutter disks have openings 45 lying in registry with characters on slide 25, each opening having a width sufficient to unmask the widest single character on the slide or being wide enough to span a plurality of characters completely unmasking the end characters of the group. No opening 45, however wide, is separated from an adjacent opening 45 by an opaque portion wider than necessary to block off completely the widest single character 27a. Also, each opening 45 extends inward radially a substantial distance beyond its associated character on the slide.

The disks 34 may be considered in pairs of odd and even designated disks, i.e., disks I and II, III and IV, V and VI, . . . and the disks of a pair are similar. Thus disks I and II both have thirty-two openings and, in the normal position of the disks, the openings in disk I lie opposite even numbered characters 27a in the series on slide 25, i.e., opposite B, D, F, . . . and the openings in disk II lie opposite odd numbered characters in the series, i.e., opposite A, C, E, . . . It thus follows that when disks I and II are in their normal position all characters 27a are blocked off. To accomplish the selection of any desired character with my complete shutter mechanism, the several shutters are positioned so that all but the desired one of the characters are blocked off. In principle, therefore, only disk II is necessary for this selection operation and disk I is provided only to permit all characters to be blocked off if desired. The disks of each successive pair have identical openings, but the two disks of a pair are of different orientation with respect to the characters 27a. Whenever a solenoid 38 associated with a particular disk 34 is energized, that disk is rotated about rod 33 through an angle equal to the spacing between the centers of adjacent characters on the slide 25 by a downward movement of rod 35 from what has been termed its normal to its off-normal position.

In order to arrange the disks 34 so that there are aligned openings in all twelve disks in registry with a selected type character, it is necessary to move six of the disks from normal. Thus, in order to permit light from the source to pass through the type character A at the top of the series on slide 25 and through aligned openings in all of the disks, disks I, IV, V, VII, IX and XI are shifted from their normal positions. To pass a beam of light from the source through character B and aligned openings in all the disks, it is necessary to shift from normal disks II, III, VI, VIII, X and XII. To pass a beam of light from the source through character C and aligned openings in all the disks, it is necessary to shift from normal disks I, III, VI, VII, IX and XI. The disks in the group required to be shifted from normal to unmask any given character in the series differ from those in the group required to be shifted from normal to unmask any other character, and the shifting of the groups of disks to cause a particular character to be photographed is accomplished by selector means to be described.

The shutters 34 here described are constructed on a binary system as both mechanical and electrical simplicity are thus assured and the movement of shutter elements is reduced to the minimum. Consider each character 27a on slide 25 to occupy a unit space of one sixty-fourth of a complete circle. Disk II has thirty-two evenly-spaced, single-unit openings separated by thirty-two single-unit mask areas. It will, in its normal position, block one-half of the characters 27a, e.g. the "even" ones B, D, F, . . . as shown in the drawings. In its off-normal position it will block the other half, e.g. the "odd" ones A, C, E, . . . Disks III and IV have sixteen evenly-spaced, triple-unit openings separated by sixteen single-unit mask areas. When disk III is in its normal position, it is arranged to block one-half of the even characters; in its off-normal position, one half of the odd. When disk IV is in its normal position, it is arranged to block the half of the even characters not blocked by disk III in normal position; in its off-normal position, the half of the odd not blocked by disk III in off-normal position. Each succeeding pair of disks V—VI, VII—VIII, IX—X and XI—XII is so constructed and oriented as to be disposable to block either half of the openings possibly remaining unblocked by the preceding disks. To control sixty-four unit spaces eleven such disks are required, operating as already explained. For each doubling of the number of unit spaces which may be controlled, it is necessary to add another pair of disks.

The shutters 34 may be located anywhere between the light source 22 and the film 62. Location near the cell 46 permits the use of smaller shutters. Location near the entrance to mirrors 57 permits the shutters 34 to limit the size of the ray cone reaching the reflecting surface and the iris diaphragm 46c may be dispensed with.

A cell 46 containing a lens made up of elements 46a, and electrically operated exposure shutter 46b between the elements 46a and an iris diaphragm 46c is carried by a standard 46e mounted in front of the selector shutters 34 for vertical adjustment in a carriage 47 movable in guideways 48 extending lengthwise centrally of housing 20 and attached to the bottom wall thereof. The effective aperture of the lens may be limited by means of the iris diaphragm 46c through control 46d for the purpose explained below. The carriage 47 is movable by an adjustment screw 49 threaded through the carriage and through a block 50 attached to the bottom wall of the housing. A light-proof bellows 51 is attached to the rim of the cell 45 at the rear side thereof and to the inner walls of housing 20.

A second carriage 52 lies in front of the cell 46 and is movable in guideways 53 attached to the bottom wall of housing 20 and aligned with guideways 48. The position of carriage 52 can be varied by means of an adjustment screw 54 threaded through the carriage and through a block 55 attached to the bottom wall of housing 20. Carriage 52 carries at its upper end a ring 56 containing a plurality of mirrors 57 attached to its inner surface and facing inwardly. There is one mirror for each type character on slide 25 and the mirrors are so placed that, when light from the source 22 passes through a given type character, aligned openings in shutters 34, and cell 46, the light strikes the optically corresponding one of the mirrors 57 and the image of the character is reflected to an image spot, which is the same for all the characters. In order that the character images may be erect after reflection in the mirror 57 when projected onto the image spot on film 62, the characters are tilted on the slide 25, as shown in Fig. 3. Facing slide 25 from cell 46, the tilt given each character can be determined according to this rule. Taking top dead center as 0° a character at that position would be right-side up and vertical. Each successive character in a clockwise direction from top dead center is tilted about its own center clockwise through an angle of twice its displacement from 0°. Thus a character at 10° clockwise displacement from top dead center is tilted 20° clockwise from the vertical; a character at bottom dead center (180° displacement), having been tilted through 360° is right side up and vertical again. In order that the entire cone of rays passing cell 46 and forming the image of the character being projected be reflected by a single mirror 57 and not overlap onto adjacent mirrors, the effective aperture of the lens must be small enough to limit the size of that cone, so that as the cone strikes the reflecting surface its diameter is not greater than the width of the mirror.

A film gate 58 is mounted horizontally on bracket 59 at the end of housing 20 remote from light source 22. Film supply reel 60 and take-up reel 61 are likewise mounted on bracket 59. A length of film 62 is fed from reel 60 across film gate 58 over guide rolls 63, 64 by a precision driven sprocket 65, which can be driven by any suitable means (not shown) to accomplish the desired spacing of character images on film 62.

Figure 17:
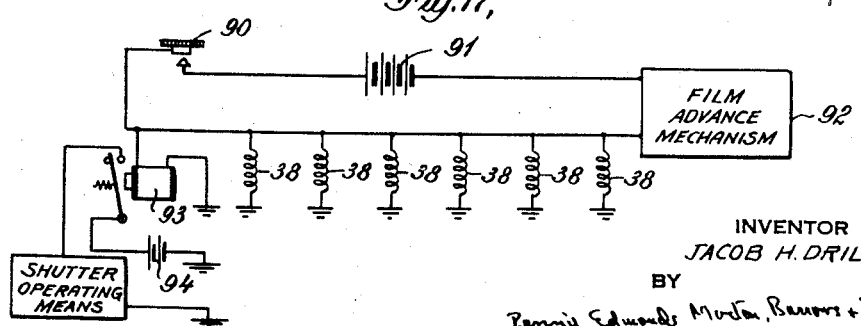
Fig. 17 is a wiring diagram of the device of Fig. 1.

The machine is operated by a keyboard containing a plurality of keys and, when a key is depressed, a picture of a selected type character may be made on the film or the operation of the keyboard may set up a memory or storage means, which later causes an entire line of characters previously selected to be photographed on the film. A simplified wiring diagram, in which the keyboard acts directly, is shown in Fig. 17. In the diagram, key 90 which is typical of all the other keys, is in circuit with a source 91 and a device generally designed 92 for operating sprocket 65 to pull film 62 across gate 58 stepwise by the space appropriate for the character to be photographed. Closing of the circuit by key 90 causes current to flow to the carriage advance mechanism and also to solenoids 38 of these six selector shutters 34 which must be moved to open a path through the shutters for a beam traveling through the particular type character selected by the key. In addition, the closing of the circuit causes current to flow to a slow-acting relay 93 in a circuit with a source of energy 94 and the means for operating the exposure shutter 46b. Accordingly, when a type character is to be photographed, the key 90 corresponding to that character is depressed and, immediately thereafter, the sprocket 65 is rotated to bring an appropriate amount of unexposed film 62 to the image spot and six of the disks 34 are shifted, so that light from source 22 may pass through the selected character and aligned openings in the disks to cell 46. After a brief interval, the exposure shutter 46b is operated and light travels through cell 46 to the appropriate one of the mirrors 57, which reflects the light in such manner that an erect image of the character is projected on the focal spot on the film. The photographing of the characters continues until a line is completed, whereupon sprocket 65 is actuated to advance the film an appropriate amount for an interline space. The machine is then ready for photographing a new line of characters on the film.

Whenever a change in the form of type to be used is desired, the slide 25 in use in the machine is removed and a slide carrying the characters of the desired form is placed in position. In the machine shown in Figs. 1–16, each slide carries a group of sixty-four characters, but, if desired, each slide may carry a greater or less number of characters. If the slide has more than sixty-four characters, additional selector shutters 34 will be required, the size and arrangement of the openings in the shutters will be varied, and it will be necessary to move a greater number of the selector shutters for the selection of a character. The formation of the selector shutters for any number of type characters in a series may be readily worked out by the binary number system. The ring 56 used in apparatus adapted for slides bearing a given number of characters will carry as many mirrors as there are characters on the slide and a slide carrying a different number of characters requires use of a ring 56 having the number of mirrors appropriate for that slide.

In the improved form of the invention illustrated in Figs. 18–21, inclusive, the housing 20 contains a light source within the casing 21 as before, but the inner end wall 23 of the casing 21 is provided with more than one series of apertures therethrough. In the example shown, a series of sixty-four apertures 24 is arranged in a circular arrangement as in the device of Fig. 1, and this is augmented by a second series of apertures 24a. The apertures 24a of this second series are also arranged on a circle, the center of which is displaced horizontally to the right from the center of the circle of apertures 24; but the unit spacing of apertures 24a, i.e. one sixty-fourth of a circle in the example shown, is the same as that of apertures 24. Segmental groups of apertures 24a are omitted from the circle where it would intersect the circle of apertures 24 at the top and bottom.

At the front of the bellows 51 there is provided a cell 66, corresponding to cell 46 in Fig. 1, but containing two projection lens systems 67 and 68. In front of the cell 66 with its center on the axis of lens system 67 is a ring 70 containing on the inside surface thereof a plurality of mirrors 71. The number of mirrors 71 correspond to the number of unit spaces in the circles of apertures 24, 24a, sixty-four in the example given.

The lens system 67 corresponding to the lens system of Fig. 1 has its optical axis arranged to intersect the center of the circle of apertures 24, and the center of the ring of mirrors 70. The lens system 68 has its optical axis displaced horizontally to the right from the axis of lens system 67. The distance that the axis of lens system 68 is thus displaced is so correlated with the distance that the center of the circle of apertures 24a is displaced from the center of the circle of apertures 24, that apertures 24a are projected by lens system 68 to the same image spot that apertures 24 are projected by lens system 67. For example, in a one to one projection ratio, as shown, the center of the circle of apertures 24a is displaced to the right twice the distance that lens system 68 is displaced to the right. The lens systems 67, 68 are respectively provided with iris diaphragms 67a, 68a and electrically operated exposure shutters 67b, 68b between their front and rear elements.

A font-carrying slide 69 is arranged in front of the inner wall 23 of the casing 21. The characters 69a, 69b thereon are tilted in accordance with the formula already explained and are arranged in registry, respectively, with the openings 24 and 24a. Slide 69 may be made up of a character bearing sheet 27 between two layers of glass 26 as already described for slide 25 shown in Fig. 3.

Between slide 69 and the projection lens systems 67, 68 is arranged an array of twelve shutter disks 34 of which only two, designated Ia and IIa, are illustrated in Fig. 18. These disks replace disks I and II shown in Fig. 1, the configuration of the balance of the disks, their arrangement and activating mechanisms being the same as shown in Fig. 1. In response to the selective positioning of the disks 34, in a manner explained below, any one of the characters 69a or 69b may be unmasked for projection. Depending upon whether the character selected is within circle 69a or circle 69b, the corresponding exposure shutter 67b or 68b will be activated.

When working with characters 69a the operation of mirrors 71 is exactly the same as the operation of mirrors 57 already described. As shown in Fig. 18, the mirrors 71 will also bring to the same image spot characters in the circle 69b. The omission of apertures 24a from the top and bottom segments of the off-center circle in which they are arranged, eliminates corresponding characters from the added group 69b. The uppermost of such characters, if present, would be projected onto the corresponding mirror 71a, with its center at spot R69b. In contrast to this the uppermost character in centered circle 69 is projected on mirror 71a with its center at spot R69. Thus, the omitted characters from the off-center ring 69b are those which would be projected most nearly along the line $D_{max}$. Any such character would likely not be projected entirely onto a single mirror 71 and, of course, any part thereof falling on an adjacent mirror would not be reflected to the desired image spot. On the other hand, the retained characters are those the light from which would be projected most nearly along the lines $D_{min}$. The outermost left and right characters 69b would be projected along the lines $D_{min}$ to the corresponding mirrors 71b and would be reflected on the center line thereof displaced only in a longitudinal direction along the mirror surface. Thus no displacement from the image spot is to be feared.

It is understood that at the image spot any suitable light sensitive medium is disposed as, for example, the film 62 in the film gate 68 shown in Figs. 1 and 1A.

In order to effect a selection of a desired character from two character arrays 69a and 69b, it is necessary that the first two disks 34, i.e., I and II, in Fig. 1 be replaced by slightly different disks Ia and IIa, shown in Figs. 20 and 21. The apertures in disk Ia are so arranged that when it is in its normal position the even characters in both arrays are unmasked, i.e., in array 69b, 1, 2, 3 . . . and in array 69a, A, C, E . . . . Shifting disk Ia to its off-normal position will mask these odd characters and unmask the even characters. The apertures in disk IIa are arranged so that when it is in normal position it masks the characters in array 69a not masked by disk Ia in normal position, but in array 69b it leaves unmasked the characters not masked by disk Ia in normal position. Shifting disk IIa to off-normal position will cause it to mask the characters it previously left unmasked and unmask those previously masked. It follows that by appropriate, but independent, manipulation of disks Ia and IIa that there can be left unmasked for the subsequent array of disks III–XII, inclusive, at will a selected one-half of the characters in either one of the character circles separately. The functioning of the remaining disk III–XII is, therefore, to choose a selected one of a maximum of thirty-two evenly alternately spaced units, precisely the same as it was in the apparatus previously described. The following table will make the operation of disks Ia and IIa plain and will also show how the positioning of shutters Ia and IIa can control which of exposure shutters 67b and 68b is to be activated.

| Disk and Position | | Characters Unmasked | Exposure Shutter Activated |
|---|---|---|---|
| Ia | IIa | | |
| Normal | Normal | 69b even | 68b |
| Normal | Off-Normal | 69a even | 67b |
| Off-Normal | Normal | 69a odd | 67b |
| Off-Normal | Off-Normal | 69b odd | 68b |

As shown in Figs. 22 and 23, instead of a ring lined with mirrors corresponding in number to the number of unit spaces in the character arrays, there may be employed a disk 72 having mounted about the periphery thereof prisms 73 to a similar number. Prisms 73 bend light from a selected character passing through lens cell 46 by refraction instead of reflection. In situations where mirror surfaces are liable to contamination or corrosion, a ring of prisms 73 may be deemed preferable.

Further, as shown in Fig. 22, a sheet of photosensitive material 74 may be carried by a carriage 75 mounted on transverse horizontal rods 76 arranged to be moved stepwise along the rods by a motor 77. The sheet of film 74 is fed to the carriage 75 from a supply roll 78 over guide rolls 79 and 80 to take-up roll 81 which can also be driven by a motor 82. The portion of film 75a between rolls 79 and 80 is in the focal plane of lens system 45. Operation of the carriage advance motor 77 is brought about similar to the operation of the sprocket 65, in Fig. 1, by the depressing of a character selecting key. Upon reaching of the end of a line, take-up roll motor 82 and carriage advance motor 77 are simultaneously activated to return carriage 75 to the position for beginning a new line and to draw down film to receive it. With this form of photosensitive material support the end product is a sheet or page of photocomposed type.

Instead of the array of shutters 34 shown in Figs. 1–16, inclusive, the selective light flash shutter mechanism of Figs. 24 and 25 may be employed. In this mechanism, a disk 83 is rotated at a rapid rate about shaft 84 by motor means (not shown). This rotating disk 83 is to be arranged immediately in front of screen 25 in a device according to Fig. 1 with a single opening 85 therein corresponding in size to the apertures 24 in that screen and coming into register with each such opening successively. A stationary brush 86 is arranged to make electrical contact with the hub 87 of a rotating contact arm 88 carried by disk 83. Spaced around the periphery of disk 83 are a number of stationary contacts 89 arranged to be wiped successively by moving contact 88. The number of stationary contacts 89 is the same as the number of apertures 24.

Each stationary contact 89 is wired as shown in Fig. 25 so that when the key 90 corresponding to a selected one of the characters 27a is depressed a circuit will be completed through a corresponding stationary contact 89, moving contact 88, brush 86, a high speed flash lamp 95 and a source of current 96. The angular relationship between the stationary contact 89 in this circuit and the character 27a to which it corresponds is so coordinated with the angular relationship between the moving contact 88 and the opening 85 in rotating disk 83 that when the lamp 95 flashes, opening 85 is in a position to unmask the character selected.

Turning now to Fig. 25, there is illustrated schematically the organization of a complete phototypograph for operation through control relays (not shown) which in turn are actuated either directly by operation of a manual keyboard or, preferably, by prepared and corrected punch cards or tape. The details of this control input do not form part of the present invention and there are already well-known in the art several systems which could be readily adapted to control my phototypograph.

In Fig. 25, the optical projection system is made up of a light source 100, a condensing or diffusing system 101, a font plate 102 carrying three circular arrays of transparent characters 102a, 102b and 102c on an opaque background, a projection lens 103, a ring of reflecting surfaces 104, and a photosensitive surface receiving the projected character at the composition area A on the optical axis of lens 103. The mirrors making up the reflecting ring 104 may be conveniently formed as regularly disposed plane facets 105 about the periphery of a cylindrical glass disc 106, the bases of which are parallel and substantially optically flat. The facets 105 are externally silvered. The disc 106 is located perpendicular to and coaxial with the optical axis of lens 103. The font plate 102 is mounted in a font plate support 107 which is movable in a plane perpendicular to the optical axis of lens 103 to bring the centers of any of the arrays 102a, 102b and 102c to coincide with that axis as called for by the control mechanism to be later described. The film 108 is fed past the composition area at A in coordination with this same control mechanism.

The control mechanism for the machine is activated from the continuously running motor 109. Power is transmitted from it to continuously running pulleys 109a and 109b.

Pulley 109a drives lay shaft 110. Gear 111 on shaft 110 drives font plate support shaft cam clutch 112. This clutch causes gear 111 to turn cam 113 to one of three positions corresponding to one of the three character arrays 102a, 102b or 102c depending upon the input signal which causes one of the three contacts 114a, 114b or 114c on the font plate support shaft commutator 114 to be energized from a control source (not shown) and thus to energize the clutch disengage magnet 115 through wiper arm 116. Font plate support 107 is spring loaded at 117 to urge cam follower 118 carried by it into contact with cam 113.

Also carried on shaft 110 is gear 119. Gear 119 provides the input drive to end-of-line clutch 120. The end-of-line clutch magnet 121 when energized from a control source (not shown) in response to a signal indicating the end of a line has been reached causes clutch 120 to engage to produce a predetermined rotation of driven shaft 122. Gear 123 carried on shaft 122 is thus driven through this predetermined rotation at the end of each line. Gear 123 drives gear 124 which in turn drives shaft 125 on which are mounted line-spacing cam 126, carriage disengage cam 127 and carriage return cam 128. The amount of rotation imparted to shaft 122 is such as to turn each of these cams through exactly one revolution during each end-of-line cycle. Also carried by shaft 122 is the commutator wiper arm 129, the angular position of which changes in synchronism with changes in the angular position of line spacing cam 126.

Cam follower 130 on line spacing rack bar 131 is spring loaded at 132 into engagement with cam 126. Line spacing rack 133 is so positioned as to be capable of engaging film advance gear 134 on carriage 135 when the carriage is in returned position. Bar 131 is mounted on a sliding pivot at 136 which in turn is supported by one end of line spacing disengage pivot arm 137 which is spring biased at 138 in a counterclockwise direction about pivot 139. A line spacing engage solenoid 140 operating on pivot arm 137 as an armature when energized moves it against its spring bias to place rack 133 in engage position. The energizing of solenoid 140 is controlled in response to input signals from a control source (not shown) in synchronism with line spacing cam 126 through coaction of wiper arm 129 and armature 141. For example, cam 126 can be so constructed as to move rack 133 through four distinct increments of linear motion against bias 132 during one revolution of gear 124. These increments can be such as to turn gear 134 through an angle sufficient to advance film 108 a distance of .020", .040", .080" and .160" respectively. If the control input signal is coded according to binary rotation as is well understood such a line spacing mechanism will permit any line spacing desired to be achieved automatically within the range .020"–.300" by increments of .020".

Also mounted on shaft 125 and turned through one revolution during each end-of-line cycle are carriage disengage cam 127 and carriage return cam 128. These cams cooperate as follows. Carriage 135 is spring biased at 142 to the right. Its movement is limited by interaction of carriage advance rack 143 with a detent mechanism to be explained later through which proper character and word spacing in each line is achieved. It suffices here to say that the profile of carriage disengage cam 127 is such as to cause cam follower 144 to pivot pull-out bar activator arm 145 about its pivot 146 and because of a proper input signal from the control system to completely release rack 143 from the detent system in time to free carriage 135 for return motion against bias 142 under the influence of cam 128 and to re-engage rack 143 and the detent system when the carriage is in the fully returned position before cam 128 returns to its starting position. Cam 128 operates on cam follower 147 to turn carriage return arm 148 counterclockwise about its pivot 149.

Continuously running pulley 109b provides the input to composition clutch 150. This is a one-revolution clutch tripped upon the receipt of a "compose" signal by clutch magnet 151. The compose signal is given after all "set-up" signals required to select the proper character and space requirements have been given and acted on by set-up mechanism of which the font array shift mechanism associated with clutch 112 is a part and the rest will be described later. Exposure shutter control cam 152 mounted on shaft 153 is driven by clutch 150. Its profile is such as to turn shutter control bell crank 154 clockwise around its pivot 155 and thus to trip photographic exposure shutter 156 at the beginning of a compose cycle and thereafter to recock it for the next compose cycle.

Also mounted on shaft 153 is selector shutter reset cam 157. Its profile is such that after the tripping of exposure shutter 156, it moves selector shutter reset bell crank 158 clockwise about its pivot 159 to reset the six pairs of selector shutters 160 to their starting position detained by their individual magnetically-controlled detents 161 against clockwise rotation about the shutter center pivot 162 under urging of the individual spring biases 163. Bell crank 158 is left at the end of each rotation of cam 157 in a position to stop clockwise motion of individual shutters 160 after they have moved clockwise one unit space from their collective starting position. Detents 161 are individually retracted as part of the set-up operation under excitation from the control circuit (not shown). The shutters 160 function exactly as the shutters 34 already described (Figs. 1, 4 and 6–16) to expose none or any one of the characters in an array on font plate 102 as the coded excitation of detents 161 demands.

Additionally, there is mounted on shaft 153 carriage advance cam 164 which engages cam follower 165 on pull-out bar activator arm 145. The profile of cam 164 is such that after exposure shutter 156 has been tripped arm 145 is pivoted clockwise about its pivot 146 and because of a proper input signal from the control system rack 143 is released from its pre-exposure engagement with the detent system and slides under influence of bias 142 to a new engagement with the detent system established as part of the set-up in response to a control circuit (not shown) input signal.

It will be understood that the size of the teeth and spaces on the rack 143 is exaggerated on the drawing in proportion to the width of film 108. One useful proportion would be film width seven inches, rack teeth .100", tooth spacing center to center .400". Engaging the rack 143 are twenty-one pairs of stop bars 166. Each stop bar is individually spring urged at 167 into engagement with rack 143. The tooth engaging (left hand) edges of the inner tips of bars 166 are progressively cut-away to the right in increments. For a rack of the dimensions suggested, if the "leading edge" of the top bar, for example, is taken as zero, the leading edge of its paired bar adjacent to it would be .210" to the right; the leading edge of the third bar would be only .010" to the right of zero but the leading edge of the fourth bar, paired with and adjacent to the third bar, would be .220" to the right of zero. In other words, the leading edges of stop bars in any pair engage the rack 143 at positions .210" apart, but the corresponding bars in adjacent pairs engage the rack at positions .010" apart, the positions progressing in the example given to the right from top to bottom. Twenty-one pull-out bars 168 engage each pair of stop bars 166 separately in notches 169 at their outer ends. Bars 168 are pivoted about pin 170 in yoke 171 at the end of pull-out bar activator arm 145 and turn at their ends away from stop bars 166 on the free ends of gag bars 172 as a fulcrum. Gag bars 172 are pivoted at their other ends on pin 173 and are spring urged by the magnetically controlled gag bar plungers 174 into the position shown. When none of the magnets controlling plungers 174 is energized (as at end-of-line cycle) motion of arm 145 about its pivot 146 will disengage the carriage. However, when any one of the magnets controlling plungers 174 is energized the gag bar 172 controlling a particular pull out bar 168 will be retracted and that pull out bar will thus have no fulcrum from which motion of pin 170 can overcome the bias at 167. Therefore, the pair of stop bars 166 controlled by that pull out bar will remain spring urged against rack 143 and at least one of them will be in an inter-tooth space of the rack. In order to permit the spacing requirement of the set-up input signal to be met when cam 164 moves pin 170, a series of twenty-one sensing switches 175 are provided. These switches are so wired that depending upon the position of the carriage one of twenty-one circuits is closed and the spacing requirement input signal operating through that closed circuit causes the proper gag bar magnet plunger 174 to be energized to permit the desired carriage motion. This arrangement with the dimensions given permits a range of carriage spacing from .010" to .200" in increments of .010".

Figure 26:
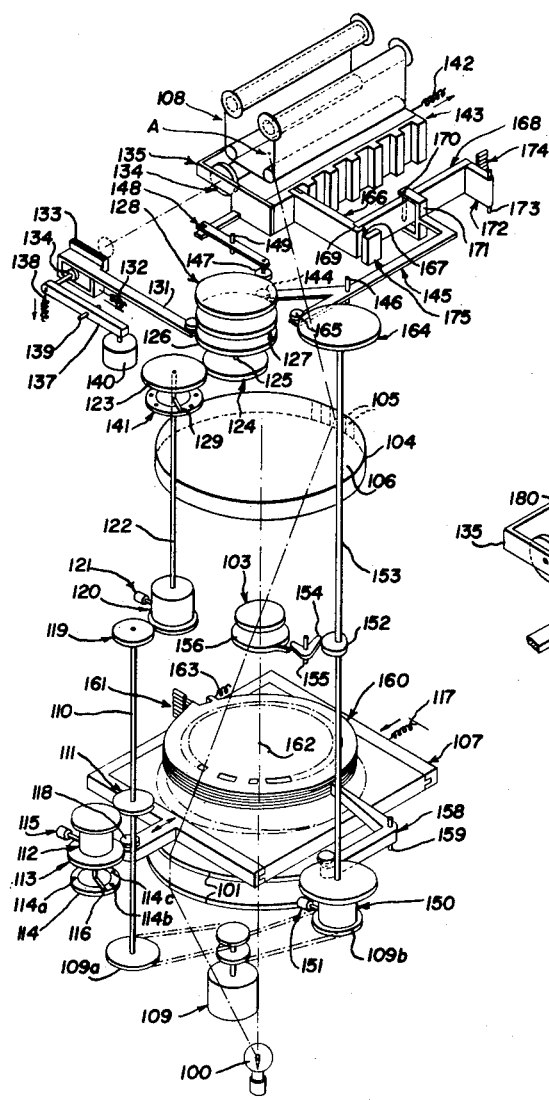
Fig. 26 illustrates schematically an alternate form of phototypograph according to my invention, including an improved spacer and film advance system.
Figure 27:
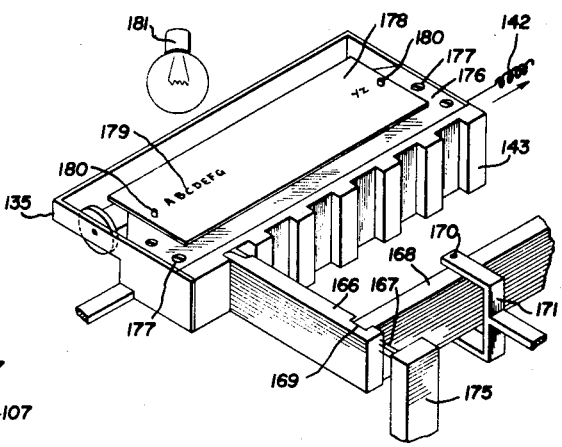
Fig. 27 illustrates schematically auxiliary mechanism for use with the phototypograph of Fig. 26 in producing character arrays or fonts.

Turning now to Fig. 26, there is shown schematically an arrangement for the manufacture photographically on a given phototypograph according to Fig. 25 of font plates 102. This arrangement comprises a matrix retainer plate 176 for attachment to carriage 135 after film 108 and associated mechanism are removed. Screws 177 serve to attach plate 175 to the carriage. Transparent matrix glass 178 carrying opaque characters 179 is carried on plate 175 precisely located by pins 180. An auxiliary source of light 181 is provided for reversing the normal direction of projection through the machine.

To make a font plate 102 font array clutch 112 is set by contact 114a to position for array 102a and selector shutters 160 are set to clear a path to the position for capital "A" for example. The carriage 135 bearing a master character matrix is positioned to place the master capital "A" at the composition area A. Light source 181 is energized and exposure shutter 156 is tripped. It will be understood, of course, that an actual machine is so constructed that light from primary light source 100 can reach film 108 only through the aperture controlled by shutter 156 and that light from auxiliary light source 181 can reach font plate 102 only through the same aperture. Further, both font plate 102 and film 108 are fully enclosed from extraneous light. Having exposed "A," carriage 135 is shifted to center "B," shutters 160 are shifted to clear a path to the "B" position, and exposure shutter 156 is again tripped. This process is continued using as many master matrices 178 as necessary to provide for all the usable spaces in all of the arrays on font plate 102. It will be observed that this method of making font plates makes errors of alignment in the facets 105 of mirror ring 104 on a given machine self-compensating.

I claim:

1. A phototypograph including, in combination, a stationary screen having a front surface of predetermined configuration on one face thereof, at least one character array consisting of a plurality of characters to be reproduced arranged in a predetermined pattern on said front surface, a single projection lens disposed in front of said front surface and so positioned that said front surface lies at an object surface thereof, a photosensitive medium disposed at a predetermined image concentration area of said image surface, a plurality of stationary light-redirecting elements between said lens and said image concentration area, said light-redirecting elements being in a predetermined pattern relative to the optical axis of said lens corresponding to the array of characters being projected, and means for projecting an image of a preselected character of said array through said lens and onto one of said stationary light-redirecting elements, said light-redirecting elements being positioned at an angle to an image beam of said array which is projected thereon to direct said image beam onto said image concentration area and to form an image of said character upon the photosensitive medium at said image concentration area, said light-redirecting elements being so positioned and correlated to the position of the characters of said array that the image beam of each character of said array is projected upon a predetermined one of said light-redirecting elements.

2. A phototypograph according to claim 1 in which the light redirecting elements are refractors.

3. A phototypograph according to claim 1 in which the light redirecting elements are reflectors.

4. A phototypograph according to claim 3 in which the characters are in a circular array and the lens is positioned in space coaxial with the circular array of characters and there is a corresponding reflector for redirecting each character similarly arranged.

5. In a phototypograph, a photographic film, means for moving the film to bring successive portions thereof to an image spot, a light source, a flat slide in front of the source carrying type characters arranged in a circular series at a uniform unit spacing on a ground of different light transmitting property, a plurality of selector shutters mounted in front of the slide for rocking movement on a common axis normal to the plane of the slide and passing through the center of the series of characters, each shutter having a plurality of openings of integral unit-space width separated from adjacent openings by a single unit-space width in a circular series, said openings being in registry with characters on the slide, the shutters differing from one another in the width, number and arrangement of their openings and being rockable on said axis to shift their openings one unit-space width to either of two alternate positions along the series of characters on the slide, a solenoid for each shutter operable to rock the shutter to one alternate position and a spring for restoring the shutter to its other alternate position, manually operable selector means for energizing selected solenoids to cause the associated shutters to rock to their respective desired alternate position to provide a single free path for a beam from the source through a selected character and aligned openings in the shutters, a projection lens and an exposure shutter mounted coaxially with the selector shutters, a ring mounted coaxially with the selector shutters, and a circular series of reflecting elements within the ring, one for each character, for directing beams passing through the characters, aligned openings in the selector shutters, the lens, and the exposure shutter upon the image spot.

6. A phototypograph including, in combination, a stationary plane object bearing a plurality of character spaces arranged in a continuous circular series at a uniform unit spacing, a single lens having its optical axis perpendicular to the plane of said object at the center of said series to form an image of a predetermined individual character of said series, a photosensitive medium in the image plane of said lens, a ring between said lens and said photosensitive medium coaxial with said lens, a plurality of plane reflecting and redirecting surfaces corresponding in number to said character spaces arranged evenly-spaced, inwardly-facing about the inner surface of said ring perpendicular to evenly-spaced radii thereof and parallel to the axis of said lens, said reflecting redirecting surfaces being so positioned and correlated to the position of the character spaces of said series that the image beams of each character space of said series are projected upon a predetermined one of said redirecting surfaces, the relative position of said ring to said lens and said photosensitive medium being such that the respective beams of light which form the individual images of each of said character spaces are separately reflected by said reflecting surfaces to a single image spot on said photosensitive medium, and selective means for causing a photographically significant quantity of light to pass separately from any one of said character spaces at will through said lens.

7. A phototypograph according to claim 6 including, in combination, a second and discontinuous circular series of character spaces on the object with adjacent spaces at the same unit spacing as the first series, the center of said second series being displaced more than one unit-space width from the center of said first series, the discontinuities in said second series occurring where the character spaces therein would overlie the character spaces in said first series and a second lens having its optical axis parallel to the optical axis of the first lens and displaced therefrom in the same direction as the center of said second series is displaced from the center of said first series, the distance of displacement of the axis of said second lens from the axis of said first lens being so chosen as to cause the several cones of light which form the individual images of each of the character spaces in said second series to be separately reflected by the reflecting surfaces to the image spot.

8. In a phototypograph, a photographic film, means for moving the film to bring successive portions thereof to an image spot, an electrically activated light source, a stationary slide in front of the source carrying type characters arranged in a circular series at a uniform unit spacing on a ground of different light transmitting property, a revolvable disk between said slide and said film having a single opening of single unit-space width therein in registry with said character series, an electric contact revolvable with said disk, a series of stationary electric contacts corresponding in number and angular spacing to the characters in said series and arranged to be engaged successively and separately by said revolvable contact, a stationary brush engaging said revolvable contact, a source of electric energy and electric conductors connecting said brush through said source of electric energy and said light source to each of said stationary contacts separately.

9. A phototypograph according to claim 5 in which a keyboard is provided to control the operation thereof, each key of said keyboard corresponding to a particular character in the series operating a switch controlling an electric circuit including a source of electric energy, a film advance mechanism, the solenoids whose activation will cause the selector shutters required to be moved to provide a single free path for a beam from the source through the corresponding character, and means for activating the exposure shutter.

10. A phototypograph according to claim 1 which includes means for moving said photosensitive medium past said image concentration area and in which the light-redirecting elements are so positioned as to cause the several images of all preselected characters to be formed at the same location and at the said relative position within said image concentration area.

11. A phototypograph including, in combination, a stationary plane object, a first and continuous circular series of an even number of character spaces arranged on said object at a uniform unit spacing, a second and discontinuous circular series of character spaces with adjacent spaces at the same unit spacing as said first series, the center of said second series being displaced more than one unit-space width from the center of said first series, the discontinuities in said second series occurring where the character spaces therein would overlie the character spaces in said first series, a first lens having its optical axis perpendicular to the plane of said object at the center of said first series forming an image of said object, a second lens having its optical axis aparallel to the optical axis of the first lens and displaced therefrom in the same direction as the center of said second series is displaced from the center of said first series, said second lens forming an image of said object in the plane of the image formed by said first lens, a photosensitive medium in the image plane of said lenses, a ring between said lenses and said photosensitive medium having its axis parallel to the optical axes of the lenses, a plurality of plane reflecting surfaces corresponding in number to the character spaces in said first series arranged evenly-spaced, inwardly-facing about the inner surface of said ring perpendicular to evenly-spaced radii thereof and parallel to the axis thereof, the mutual relative positions of said ring, said lenses and said photosensitive medium being so adjusted that the several cones of light that form the individual images of each of said character spaces are separately reflected by said reflecting surfaces to a single image spot on said photosensitive medium, and four or more selector shutters mounted between the object and the lenses, two of said selector shutters having only openings of a single unit-space width, the openings in said two shutters being in two groups, one in registry with said first series and one in registry with said second series, the openings in one of said groups in one of said shutters being shifted by one unit-space with respect to the openings in the same group in the other of said shutters when the openings in both shutters in the other group are aligned.

12. A phototypograph according to claim 1 in which the light redirecting elements are externally silvered facets on the peripheral surface of a transparent cylinder.

References Cited in the file of this patent

UNITED STATES PATENTS

| | | |
|---|---|---|
| 582,157 | Eaton | May 4, 1897 |
| 1,632,163 | Belin | June 14, 1927 |
| 1,776,527 | Uher | Sept. 23, 1930 |
| 1,933,650 | Bascom | Nov. 7, 1933 |
| 1,944,111 | Schieren | Jan. 16, 1934 |
| 2,180,417 | Huebner | Nov. 21, 1939 |
| 2,203,437 | Levy | June 4, 1940 |
| 2,211,320 | Efron | Aug. 13, 1940 |
| 2,346,251 | Bryce | Apr. 11, 1944 |
| 2,351,126 | Highton | June 13, 1944 |
| 2,486,406 | Higonnet | Nov. 1, 1949 |
| 2,633,232 | Drillick | Dec. 22, 1953 |